UNITED STATES PATENT OFFICE.

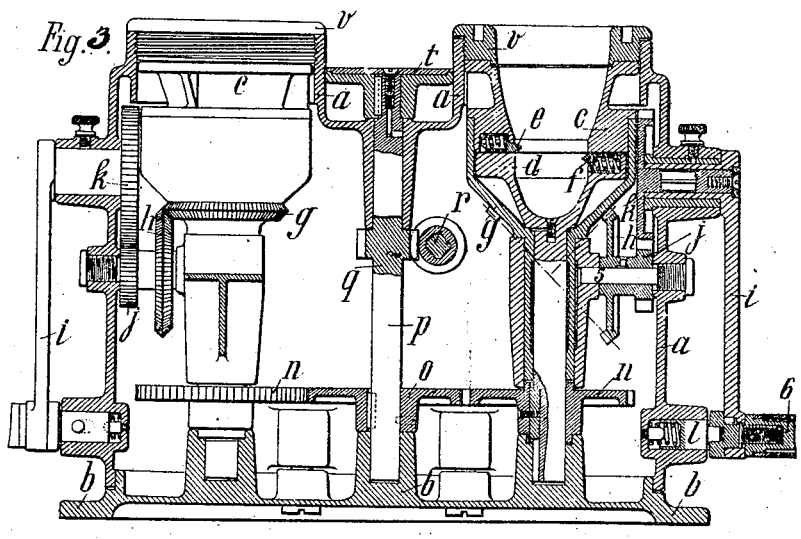
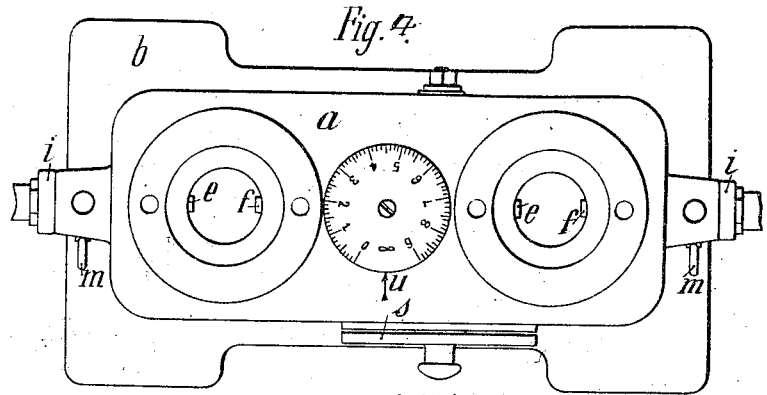
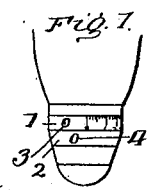
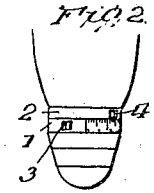

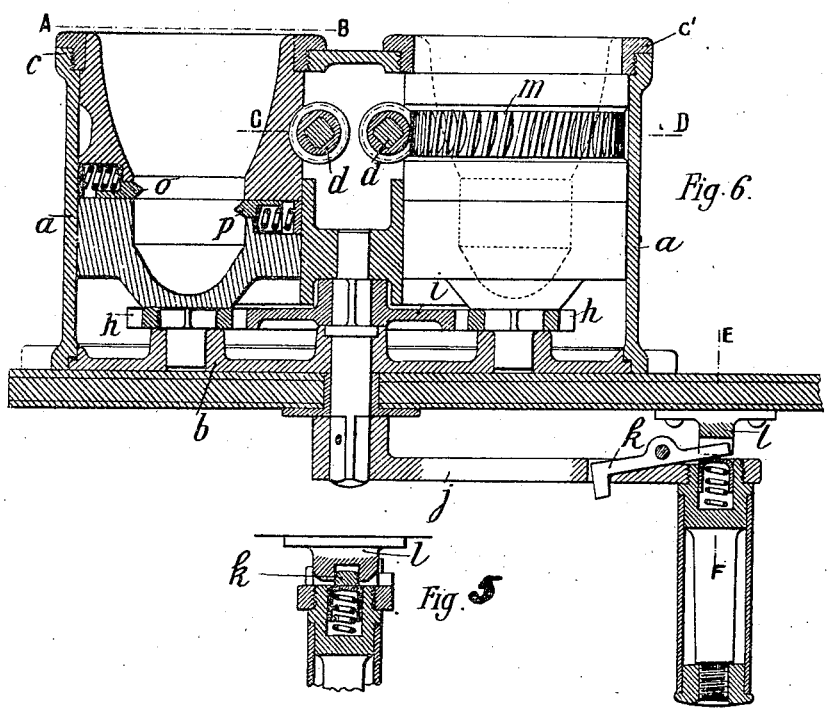
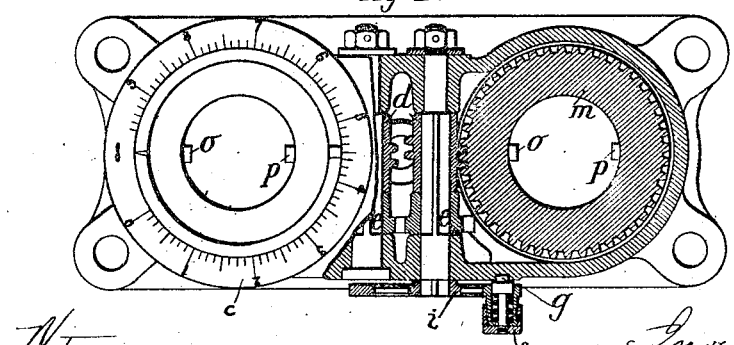

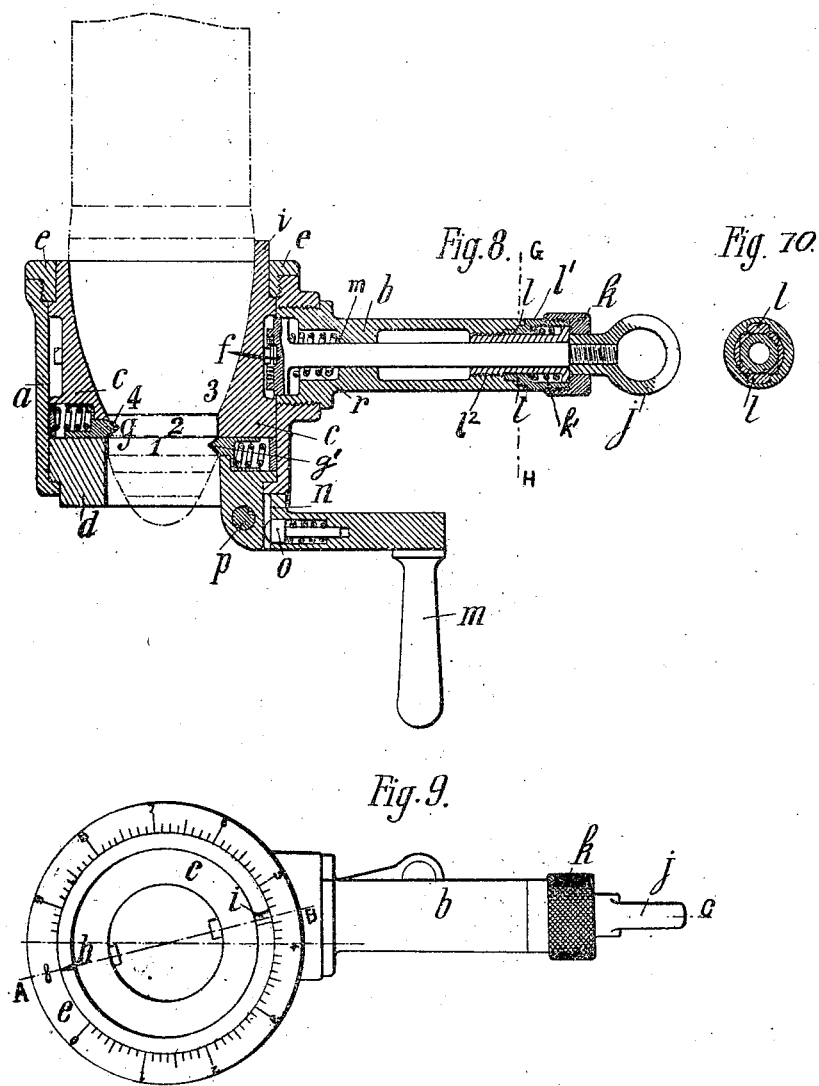

CHARLES PROSPER EUGÈNE SCHNEIDER AND JEAN BAPTISTE GUSTAVE ADOLPHE CANET, OF LE CREUSOT, FRANCE.

APPARATUS FOR SETTING TIME-FUSES.

SPECIFICATION forming part of Letters Patent No. 699,900, dated May 13, 1902.

Application filed June 18, 1901. Serial No. 64,994. (No model.)

*To all whom it may concern:*

Be it known that we, CHARLES PROSPER EUGÈNE SCHNEIDER, iron-master, and JEAN BAPTISTE GUSTAVE ADOLPHE CANET, engineer, residing at Le Creusot, Saône-et-Loire, in the Republic of France, have invented certain new and useful Improvements in Apparatus for Setting Time-Fuses, of which the following is a full, clear, and exact specification.

Heretofore the setting of time-fuses, also known as "dial-fuses," has generally been effected by hand—that is to say, without the assistance of special mechanism for such purposes. These fuses (one being shown in elevation at Figure 2 of the accompanying drawings) are for the purpose of setting them provided with a scale and an index or pointer carried, respectively, by a movable ring or disk 1 and a fixed ring or disk 2, connected with the body of the fuse. By turning one of the rings relatively to the other it is evident that the length of fuse composition to be burned will be increased or diminished in accordance with the variation of the angular displacement of one ring relatively to the other. In order that the setting may be exact, it is necessary for two predetermined points—that is to say, the index and one of the graduations of the scale—to be set so as to coincide. When effected by hand in the usual manner, the said setting is wanting in rapidity and precision, and, furthermore, no means for controlling the setting of the fuse exist, and the adjustment therefore necessarily varies in each fuse, whereas for accurate firing such adjustment should be identical.

According to our invention we employ a mechanical arrangement for setting time-fuses which not only greatly facilitates the operation of setting, but at the same time renders such setting absolutely precise and identical for any number of fuses and affords every facility of control.

In principle our invention comprises an apparatus which can be applied to the fuse on the projectile or inversely, into which the head of the projectile, with its fuse, can be inserted. The said apparatus is provided with two clutch-pieces so arranged as to be capable of engaging with appropriate recesses 3 and 4 in the stationary ring 1 and the movable ring 2, respectively, when the setting of the fuse is to be effected and to be automatically or otherwise disengaged from the said recesses to allow of the removal of the projectile after the setting has been performed. One or both of these clutch-pieces may be movable, so as to enable their angular distance apart to be altered at will, and this angular distance, which may be read off a divided scale or dial, determines the corresponding angular position of the recesses 3 and 4, and consequently also the desired setting of the fuse when the said recesses are engaged by their respective clutch-pieces.

In order that our said invention may be clearly understood and readily carried into effect, we will proceed to describe the same more fully with reference to the accompanying drawings, which illustrate, by way of example, various forms of the apparatus.

Figs. 1 and 2 are elevations of time-fuses such as are adapted to be set by the apparatus of this invention. Fig. 3 is a vertical longitudinal section, and Fig. 4 a plan view, of an apparatus embodying my invention. Figs. 6 and 7 are similar views of a different embodiment of the invention, and Fig. 5 a detail sectional view on line E F of Fig. 6. Figs. 8 and 9 are views similar to Figs. 6 and 7 of still another embodiment, and Fig. 10 is a sectional view on line G H of Fig. 8.

As shown in the drawings, our apparatus comprises a rectangular casing $a$, mounted on a base $b$ and inclosing two mechanical contrivances of symmetrical form for setting the fuses, each of such contrivances comprising a cup-shaped carrier $c$ and a fuse-cap $d$, arranged in the same vertical axis and furnished with two spring-operated locking-bolts $e f$. The cup-shaped carrier is prolonged downwardly by a conically-shaped part and a hollow rod, the former of which is provided with bevel-teeth $g$. The hollow rod enters a socket forming part of the casing, said socket constituting a guide both for the carrier and the stem of the fuse-cap. The bevel-teeth $g$ gear with a bevel-wheel $h$, whose diameter is equal to that of the toothed portion of the carrier and which is carried by a small horizontal shaft 5. The said wheel $h$ is connected through the intervention of spur-wheels $j$ $k$ to a crank $i$, having a handle 6. The cranks, which are disposed at the ends of the casing, are retained in a vertical downward position by means of spring-controlled pins $l$, adapted to engage with the rear portions of the said handles. The locking-pin $l$ is provided with a finger-piece $m$, Fig. 4, by which it can be disengaged from the crank-handle when the latter is required to be operated; but said pin reëngages automatically with the recess each time the crank returns to this vertical downward position. The gear-wheels are so proportioned that for each revolution of the crank the cup-shaped carrier $c$ performs two revolutions. The fuse-cap $d$, which is situated within the said carrier, is prolonged by a downwardly-projecting rod or stem which serves as a guide and support by extending for its entire length through the hollow rod of the carrier and entering at its lower end into a socket in the base-plate of the casing. The stem is fitted near its lower end with a spur-wheel $n$, gearing with another spur-wheel $o$ of equal diameter, keyed to a vertical shaft $p$, provided in the center of the casing. At a convenient part of the shaft $p$ is formed a worm-wheel $q$, which is operated by a worm $r$, the horizontal shaft of which worm extends transversely through the casing and is provided with a wheel $s$, having a crank-handle. This handle is provided with a spring-controlled piston, so as to enable the said wheel to be fixed in the required stopping position by means of a pin or catch engaging in appropriate recesses provided in the casing. The vertical shaft $p$ projects beyond the upper part of the casing, so as to receive the dial $t$, which is provided with graduations corresponding with those on the fuse, an index $u$ being engraved upon the casing. Obviously by operating the wheel $s$ the position of both of the fuse-caps is simultaneously adjusted, such position being determined by the graduations of the dial and the index on the casing. Thus the angular position of the bolts $f$ relatively to the fixed bolts $e$ is adjusted. Collars $v$, detachably screwed into the casing, keep the cup-shaped carriers in their places, while permitting their removal when required. They also serve as guides for the projectiles and protect the edges of the carriers.

For setting a fuse such as that shown in Fig. 2, whatever may be at this time the position of the movable ring, the procedure is as follows: First, find on the dial the graduation or division for the required period of combustion of the fuse composition, and then move it into a position opposite to the index on the casing. For this purpose it will be necessary to disengage the locking pin or catch of the handle of the wheel $s$ from its recess and then turn the said wheel in the desired direction until the desired graduation or division nearly coincides with the index, whereupon the locking pin or catch is allowed to enter the nearest hole to stop the wheel in the exact position. Second, place the projectiles in the cup-shaped carriers without troubling about the position of the recesses in the fuses or of the corresponding bolts. The form of the said bolts is such as to enable them to enter their recesses by compressing their springs, and the latter can only eject the bolts again when the recesses in the fuse are brought opposite the bolts. Third, turn each crank-handle $i$ one revolution in the desired direction either successively or simultaneously, according to whether one or both projectiles are in position. The fuse is properly set after a revolution of the crank-handle and its reëngagement with the locking-pin $l$. It will be clear that the stationary ring 2 of the fuse has now acquired its proper position relatively to the movable ring 1, and that therefore the angular distance apart of the recesses in the stationary and fixed rings corresponds with that previously given to the bolts $e$ and $f$. The engagement of the locking-pin $l$ with the handle is, as already stated, automatic, and it is only necessary to disengage it by pushing back the finger-piece $m$, connected with the said locking-pin, without, however, having to remove the hand from the crank-handle. Fourth, lift out the projectiles vertically without turning them and then replace them by fresh ones. As the projectiles are removed the bolts disengage themselves. The time required for setting a fuse is equivalent to the time occupied in giving one revolution to the crank-handle. If it is desired to alter the setting of a fuse that has already been set, it suffices to actuate the wheel $s$ in the manner previously stated, so as to move the dial $t$ and bring the required graduation or division-line thereon opposite to the index, and in this manner the fuse can be reset without the use of the crank-handles $i$.

The apparatus shown in Figs. 5, 6, and 7 comprises the casing $a$, formed with two cylindrical portions connected together and having a common base E. Each cylindrical portion contains a cup-shaped carrier and a fuse-cap furnished with the spring-bolts $o$ $p$, similar to those previously described. The plate $b$ closes the casing $a$ at the lower end, while at the upper end of said casing are two graduated rings $c$ $c'$, which serve to keep the fuse-caps and the carriers in their proper position within the aforesaid cylindrical portions. The said carriers are formed with worm-teeth $m$ on their peripheral surfaces, and said teeth gear with worms $d$ $d$, which are operated simultaneously by spur-pinions $e$ $e$. One of the spindles of said worms is provided at its extremity with a wheel $i$, furnished with a handle $f$. As in the previously-described arrangements, this handle is constructed with a spring-controlled piston, and its locking pin or catch $g$ engages with a recess in the casing when the correct coincidence of the division-lines or graduations of the graduated rings with the index is obtained. Each fuse-cap is furnished at its lower part with a toothed pinion $h$, gearing with a toothed wheel $i$, the shaft of which is suitably mounted in the casing $a$ and the base $b$. The lower end of said shaft projects through the lid of the ammunition-chest or box, where it is fitted with a crank-handle $j$ for operating the apparatus. This handle is provided with a catch $k$, adapted to enter a slot $l$ in a block fixed to the said lid. The apparatus is adjusted for the required setting of the fuse by moving the carriers, with their graduated rings, to a point opposite to the proper division-line or graduation of the said graduated rings. This operation is effected in both carriers simultaneously by operating the wheel $i$. For setting the fuses of the projectiles placed in the apparatus a revolution of the crank-handle $j$ is effected in either direction, the said crank-handle being unlocked by pressing the protruding end of the catch $k$ inward. The reëngagement takes place automatically at the completion of the rotation of the said crank-handle. Readjustments of the setting of the fuses may be effected when the projectiles are in the apparatus, and if the bolts have been set to engage with the fuses by previous adjustment the alteration or readjustment is effected automatically by operating the wheel $i$, without its being necessary to again operate the handle $j$.

The fuse-setting apparatus shown in Figs. 8, 9, and 10 are constructed in single form and are therefore easily transported from place to place. They may be held in the hand while in use or may be otherwise held in any convenient manner. The apparatus shown in Figs. 8 and 9 comprises a casing $a$, with a handle $b$, said casing containing a cup-shaped carrier $c$ and a fuse-cap $d$, which are retained in position in the casing by a graduated ring $e$. The carrier is furnished on its periphery with teeth that gear with a spiral gear $f$, carried by a spindle which is supported in the handle $b$. At one of its extremities the said carrier is furnished with a spring-controlled bolt $g$, and it also has an index $h$, Fig. 9, on its outer face and a stud $i$ for moving said carrier by hand. The spiral gear $f$ may be disengaged by a slight pull on the ring $j$, forming part of the aforesaid spindle of the handle $b$, so as to compress a spring $r$, which bears at one end against a shoulder $m$ of handle $b$ and at its other end against the rear face of the spiral gear $f$. A milled head $k$ has a square opening therein, in which the square shank of ring $j$ loosely engages. Head $k$ is securely screw-threaded to a sleeve $l'$, which may be slid to the right, Fig. 8, on a tubular part $l^2$ against the tension of coiled spring $k'$. Teeth $l\,l$ on sleeve $l'$ engage corresponding notches in handle $b$ when the parts are in the position shown in Fig. 8. Pulling on the ring $j$ to disengage gear $f$ from the teeth on carrier $c$, as above explained, does not move milled head $k$ and associated parts. By pulling milled head $k$ to the right, Fig. 8, and compressing spring $k'$ teeth $l\,l$ are disengaged from their notches. If, then, the head is turned, the ring $j$ and its spindle will be rotated. Spiral gear $f$, being in engagement with the teeth of the carrier, will rotate the same. The fuse-cap $d$ is furnished with a crank-handle $m$ for revolving it, and its angular position in the apparatus is determined by a tooth $n$ on the crank-handle engaging with a recess in the casing of the apparatus. A spring-actuated plunger $o$ and a pivot $p$ are so arranged as to permit the crank-handle to be readily unlocked and to be afterward again automatically locked. The spring-actuated plunger normally tends to elevate the plunger, so that the tooth $n$ engages its recess. The apparatus is adjusted for setting the fuse by causing the index $h$ of the carrier to coincide with the desired division-line or graduation on the ring $e$. For this purpose it suffices to so act on the milled head $k$ as to disengage the teeth $l\,l$ and revolve them in either direction, the correct coincidence between the index and the division-lines or graduations being obtained only when the teeth $l$ reëngage in their recesses. In order to expedite the preliminary setting of the apparatus, the spiral gear is disengaged by slightly pulling the ring $j$, and then the index is moved into a position approximately adjacent to the desired division or graduation by means of the stud $i$, the ring $j$ being at the same time released. The milled head $k$ is then operated to reëngage the spiral gear if such reëngagement has not already taken place. The exact adjustment of the index relatively to the required division-line or graduation is thus obtained. The alterations in this adjustment, which are mostly of small amplitude, are obtained by moving the head $k$. With this apparatus it suffices to merely place it over the fuse of the projectile held by an attendant and then to give two revolutions to the crank-handle $m$ for obtaining the proper setting of the fuse. When the crank-handle $m$ has been returned to its initial position, the tooth $n$ enters its recess, and the distance between the bolts $g$ and $g'$ determines the exact angular distance between the recesses 3 and 4 of the fuse-rings. By taking the precaution to previously introduce the bolt $g$ in its recess a single revolution of the crank-handle will suffice.

It is obvious that with the various forms of apparatus hereinbefore described the form, arrangement, and operation of the various elements may be varied within wide limits without departing from the invention. It will also be obvious from the previous description that the apparatus may be portable or may be fixed upon an ammunition-box or a gun-carriage, or it may be arranged to be held by hand.

What we claim, and desire to secure by Letters Patent of the United States, is—

1. In apparatus for setting time-fuses, a casing, two members rotatably mounted in said casing, locking means for holding one of said members in any desired position of adjustment in the casing, manually-operable means for rotating the other member, and catches one on each member adapted to engage respectively with and temporarily lock the members to the two parts of the fuse which are relatively adjustable to give the desired setting.

2. In apparatus for setting time-fuses, a casing, two members rotatably mounted in said casing, locking means for holding one of said members in any desired position of adjustment to which it is rotated, manually-operable means for rotating the other member, a stop device acting to arrest the rotation of said other member when it reaches a certain predetermined position, and a catch on each member adapted to engage respectively with and temporarily lock the members to the two relatively movable parts of the fuse.

3. In apparatus for setting time-fuses, a casing, two members rotatably mounted therein, manually-operable gearing for rotating one of said members to any desired position of adjustment and for locking it in said position, manually-operable means for rotating the other member, a stop device acting to arrest the rotation of said member when it reaches a certain predetermined position, and a catch on each member adapted to engage respectively with and temporarily lock the members to the two relatively movable parts of the fuse.

4. In apparatus for setting time-fuses, a casing, two hollow members rotatably mounted therein adapted to embrace a fuse inserted therein, manually-operable means for rotating one of said members to any desired position of adjustment, manually-operable means for rotating the other member, and a spring-actuated catch on each member adapted to engage respectively with and temporarily lock the member to the two relatively movable parts of the fuse.

5. In apparatus for simultaneously setting two time-fuses, a casing, two mechanisms in said casing each comprising two hollow rotatable members adapted to embrace a fuse inserted therein, manually-operable means common to both mechanisms for simultaneously rotating one of the members of each mechanism to any desired position of adjustment, manually-operable means common to both mechanisms for simultaneously rotating the other member of each mechanism, spring-actuated catches one on each member adapted to engage respectively with and temporarily lock the members to the relatively movable parts of the fuses.

In witness whereof we have hereunto set our hands in presence of two witnesses.

CHARLES PROSPER EUGÈNE SCHNEIDER.
JEAN BAPTISTE GUSTAVE ADOLPHE CANET.

Witnesses:
JEAN GAMET,
EDMOND BLAISE.